United States Patent
DeWald

(10) Patent No.: US 6,536,560 B1
(45) Date of Patent: Mar. 25, 2003

(54) SINGLE BRAKING ASSEMBLY FOR A DRIVE AXLE

(75) Inventor: Gregory T. DeWald, Mooresville, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/994,244

(22) Filed: Nov. 27, 2001

(51) Int. Cl.$^7$ .............................................. F16D 55/36
(52) U.S. Cl. ................................... 188/71.5; 188/18 A
(58) Field of Search ........................... 188/18 A, 71.5; 192/70.21

(56) References Cited

U.S. PATENT DOCUMENTS

| | | | |
|---|---|---|---|
| 2,991,664 A | | 7/1961 | Bernotas ....................... 74/711 |
| 3,439,785 A | | 4/1969 | Hughson ........................ 192/4 |
| 3,707,207 A | * | 12/1972 | Kondo ....................... 188/71.5 |
| 3,772,940 A | * | 11/1973 | Ohtsuka et al. ............. 188/71.5 |
| 3,877,321 A | * | 4/1975 | Storer, Jr. ................... 188/71.1 |
| 3,994,375 A | | 11/1976 | Stritzel ........................ 194/4 A |
| 4,207,968 A | * | 6/1980 | Chamberlain ................ 188/369 |
| 4,610,331 A | * | 9/1986 | Rogier et al. ................ 180/370 |
| 5,009,290 A | * | 4/1991 | Harada et al. .............. 188/71.5 |
| 5,158,508 A | * | 10/1992 | Sakaguchi et al. .......... 188/71.5 |
| 5,337,853 A | | 8/1994 | Magni ......................... 180/370 |
| 6,354,421 B1 | * | 3/2002 | Mochizuki et al. ......... 188/71.5 |

FOREIGN PATENT DOCUMENTS

| | | | | |
|---|---|---|---|---|
| DE | 3340411 | * | 5/1985 | ................. 188/71.5 |
| EP | 289177 | * | 11/1988 | ................. 188/73.5 |
| WO | WO 88/08383 | * | 11/1988 | ................. 188/71.5 |

* cited by examiner

Primary Examiner—Christopher P. Schwartz
Assistant Examiner—Devon Kramer
(74) Attorney, Agent, or Firm—Dykema Gossett PLLC

(57) ABSTRACT

A brake assembly having a single brake capable of applying a braking torque to both axle half shafts in a drive axle is provided. The brake assembly includes a piston that selectively actuates both a differential locking clutch and a braking clutch each of which may comprise a friction plate assembly. The piston urges the differential locking clutch against a friction surface formed on a differential hub that is mounted on a differential carrier and is axially movable relative to the carrier. The braking clutch is then urged by movement of the differential hub against another braking surface formed on a stationary brake housing. The plates of the braking clutch are coupled to the differential carrier allowing a braking torque to be transmitted through the carrier to both axle half shafts using a single braking device.

20 Claims, 2 Drawing Sheets

SINGLE BRAKING ASSEMBLY FOR A DRIVE AXLE

BACKGROUND OF THE INVENTION

1. Field of the Invention

This invention relates to vehicle wheel differentials and, in particular, to a brake assembly for use with the differential.

2. Disclosure of the Related Art

A conventional drive axle assembly for driving one or more wheels on opposite sides of a vehicle includes a drive axle comprised of two axle half shafts. The axle assembly further includes a differential that drives the axle half shafts and enables the shafts to rotate at different speeds. The axle assembly further includes two separate braking devices used to brake the wheel or wheels driven by the respective axle half shafts.

The use of multiple braking devices to brake the driven wheels has several disadvantages. For example, the use of multiple braking devices requires additional parts and materials and increases assembly time-all of which increase the cost of the drive axle assembly. The use of multiple braking devices also increases the size and weight of the drive axle assembly.

U.S. Pat. No. 3,994,375 illustrates the use of a single brake assembly for use in braking the wheels on both sides of the drive axle. The disclosed brake assembly, however, still requires the use of multiple actuators and significantly increases the size of the axle and differential housings thereby creating potential interference with other vehicle components.

There is thus a need for a brake assembly that will minimize or eliminate one or more of the above-mentioned deficiencies.

SUMMARY OF THE INVENTION

The present invention provides a brake assembly for a drive axle.

A brake assembly for a drive axle in accordance with the present invention includes a brake housing. The brake housing may be coupled to a differential carrier that is disposed about a first axis and the brake housing may include a first portion extending radially and a second portion extending axially from the first portion. The brake assembly also includes a differential hub that is coupled to the differential carrier and is axially movable relative to the differential carrier and the brake housing. The brake assembly further includes first and second friction plate assemblies. The first friction plate assembly is disposed on a first side of the differential hub between the differential hub and the brake housing and is axially movable relative to the differential carrier and the brake housing. The second friction plate assembly is disposed on a second side of the differential hub and is also axially movable relative to the differential carrier. Finally, the brake assembly includes a piston that selectively urges the second friction plate assembly, the differential hub, and the first friction plate assembly in a first axial direction against the brake housing. The inventive brake assembly both provides locking capacity to the differential, thereby preventing or limiting the two axle half shafts of the drive axle from rotation at different speeds, and provides braking capacity to the axle half shafts for stopping the vehicle.

A brake assembly in accordance with the present invention represents a significant improvement as compared to conventional drive axle brake assemblies. In particular, the use of a single brake assembly to brake the driven wheels reduces the number of parts and materials required as compared to conventional drive axle assemblies and decreases assembly time thereby reducing the cost of the drive axle assembly. The use of a single brake assembly also decreases the size and weight of the drive axle assembly relative to conventional drive axle assemblies.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
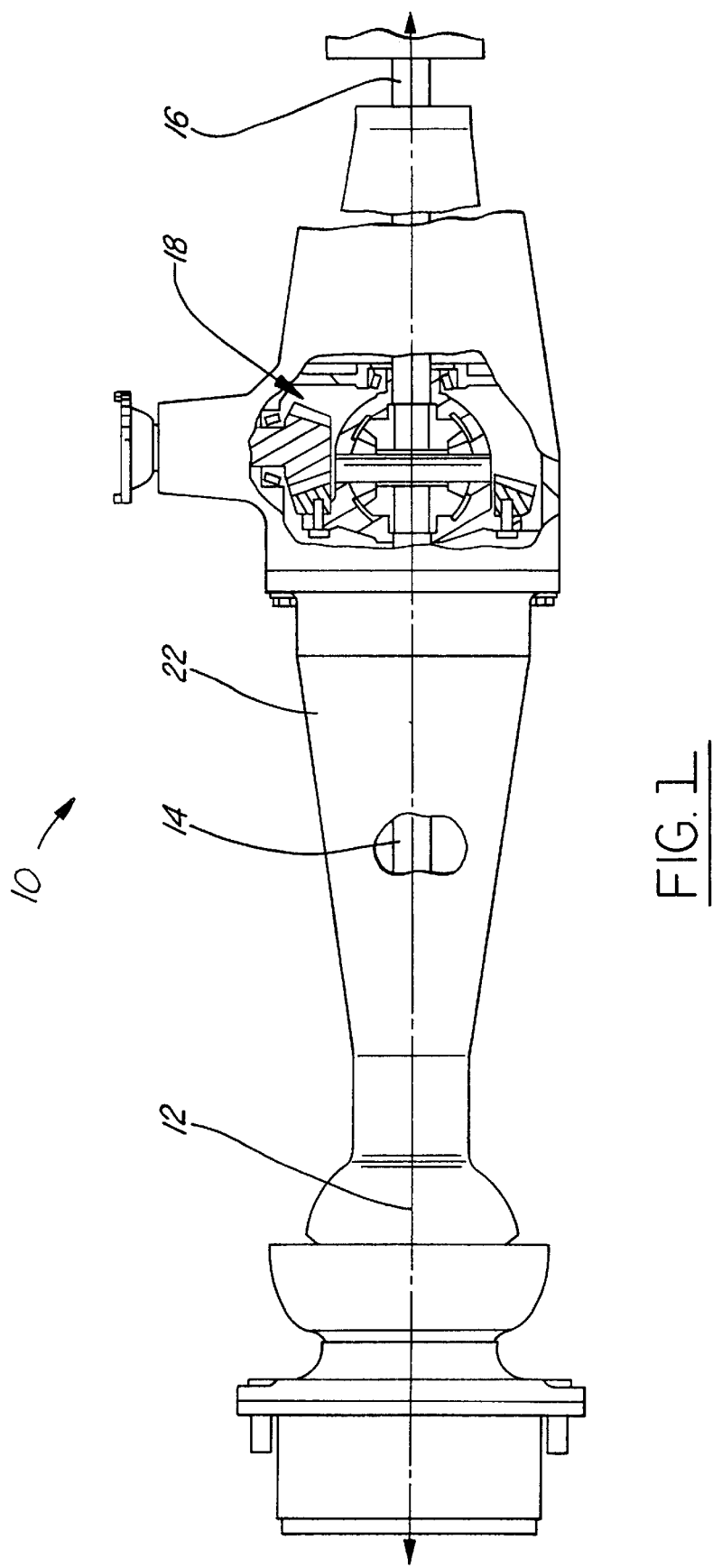
FIG. 1 is a top view of a drive axle assembly.
Figure 2:
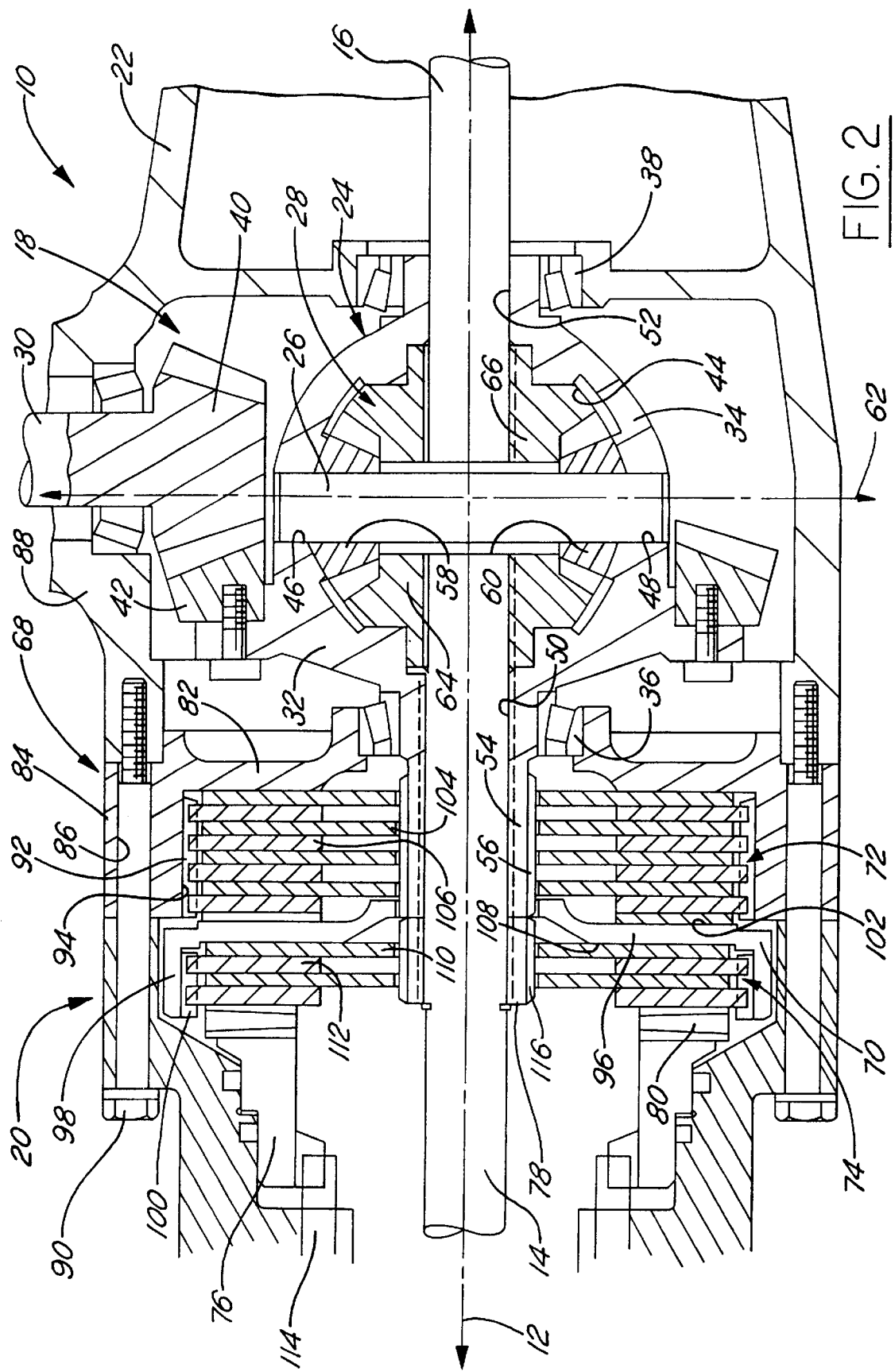
FIG. 2 is a partial cross-sectional view of the drive axle assembly of FIG. 1 illustrating a brake assembly in accordance with the present invention.

Referring now to the drawings wherein like reference numerals are used to identify identical components in the various views, FIG. 1 illustrates a drive axle assembly 10 disposed about an axis 12. Assembly 10 is provided to drive one or more wheels disposed at either axial end of assembly 10. The illustrated assembly 10 is configured for use with an off-highway vehicle. It should be understood, however, that the present invention may find use in wide variety of conventional vehicles. Assembly 10 includes axle half shafts 14, 16 and a differential 18. Referring to FIG. 2, assembly 10 may also include a brake assembly 20 in accordance with the present invention.

Referring again to FIG. 1, shafts 14, 16 are provided to transfer torque to one or more vehicle wheels disposed at either axial end of assembly 10. Shafts 14, 16 are conventional in the art and may be disposed within an axle housing 22.

Differential 18 is provided to allow shafts 14, 16, and wheels, to rotate at different speeds. Differential 18 is also conventional in the art. Referring to FIG. 2, differential 18 may include a differential carrier 24, a pinion shaft 26, and a differential gear set 28.

Carrier 24 is provided to transfer torque from a power input shaft 30 to gear set 28. Carrier 24 may be made from conventional metals and metal alloys. Carrier 24 is disposed about axis 12 and includes first 32 and second members 34 that may be coupled together using conventional fasteners (not shown). Members 32, 34 are supported within the differential 18 and axle housings 22 on bearings 36, 38 and rotate responsive to torque provided by input shaft 26 through a pinion gear 40 mounted to one end of shaft 26 and a ring gear 42 coupled to, or integral with member 32. Members 32, 34 together define a cavity 44 configured to receive gear set 28. Members 32, 34 further define corresponding recesses 46, 48 configured to receive pinion shaft 26. Finally, members 32, 34 define openings 50, 52 configured to receive axle half shafts 14, 16 and from which axle half shafts 14, 16 extend. Member 32, 34 further includes an axially extending portion 54 having one or more splines 56.

Pinion shaft 26 is provided to transfer torque from carrier 24 to gears 58, 60 of gear set 28. Shaft 26 is conventional in the art and may be made from conventional metals and metal alloys. Shaft 26 has a longitudinal axis 62 perpendicular to axis 12 and is received within recesses 46, 48 of members 32, 34 of carrier 24. Gears 58, 60 are mounted to shaft 26 proximate either end of shaft 26.

Gear set 28 is provided to transfer torque to axle half shafts 14, 16 and is convention in the art. Gears 58, 60 are disposed about pinion shaft 26 while gears 64, 66 are disposed about axle half shafts 14, 16, respectively. Rotation of gears 58, 60 responsive to rotation of pinion shaft 26 and carrier 24 causes a corresponding rotation in gears 64, 66 and axle half shafts 14, 16.

Brake assembly 20 is provided to brake rotation of axle half shafts 14, 16 and, therefore, the wheels disposed on either axial end of drive axle assembly 10. In accordance with the present invention, assembly 20 may include a brake housing 68, a differential hub 70, a first friction plate assembly 72, a second friction plate assembly 74, and a piston 76. Assembly may also include an adapter hub 78 and a thrust bearing 80.

Brake housing 68 is provided to support and enclose several components of brake assembly 20 and also provides a friction surface used in braking axle half shafts 14, 16. Housing 68 may be made from conventional metals and metal alloys known in the art. Housing 68 may include a first portion 82 and a second portion 84. First portion 82 may extend generally radially outward from carrier 24 and may be supported thereon by bearings 36. Second portion 84 may extend axially from first portion 82 and may include an axially extending bore 86. Bore 86 may align with corresponding bores in axle housing 22 and differential housing 88 and may be sized to receive a fastener 90 such as a screw or bolt therethrough. Second portion 84 may also include one or more axially extending splines 92 on a radially inward side 94 for a purpose described hereinbelow.

Hub 70 is provided to support components of friction plate assembly 74. Hub 70 also compresses friction plate assembly 72 upon actuation of brake assembly 20 and provides a friction surface against which friction plate assembly 72 acts. Hub 70 may be made from conventional metals and metal alloys. Hub 70 may be disposed about axis 12 and may have a generally radially extending portion 96 coupled to carrier 24 on spline(s) 56 such that hub 70 may be axially movable relative to carrier 24 and/or brake housing 20. Hub 70 may include an axially extending portion 98 coupled to, or a integral with, portion 96. Portion 98 may include one or more axially extending splines 100 for a purpose described hereinbelow.

First friction plate assembly 72 functions as a braking clutch. Assembly 72 is disposed on a first side 102 of differential hub 70, between hub 70 and portion 82 of brake housing 68 and is axially movable relative to hub 70 and brake housing 68. Assembly 72 may include one or more conventional friction plate members 104 and one or more corresponding conventional reaction plate members 106. In the illustrated embodiment, assembly includes four friction plate members 104 and four reaction plate members 106. It should be understood, however, that the number of members 104, 106 may vary without departing from the spirit of the present invention. Friction plate members 104 may be coupled to carrier 24 through spline(s) 56 on carrier 24 while reaction plate members 106 may be coupled to brake housing 68 through spline(s) 92 on housing 68.

Second friction plate assembly 74 functions as a differential clutch or locking device. Assembly 74 is disposed on a second side 108 of differential hub 70 and is axially movable relative to carrier 24. Assembly 74 may also include one or more conventional friction plate members 110 and one or more corresponding conventional reaction plate members 112. In the illustrated embodiment, assembly includes two friction plate members 110 and two reaction plate members 112. It should again be understood, however, that the number of members 110, 112 may vary without departing from the spirit of the present invention. Friction plate members 110 may be coupled to adapter hub 78 as described hereinbelow. Reaction plate members 112 may be coupled to portion 98 of differential hub 70 through spline(s) 100.

Piston 76 is provided to selectively urge second friction plate assembly 74, differential hub 70, and first friction plate assembly 72 in an axial direction against first portion 82 of brake housing 68. Piston 76 may be actuated by fluid pressure (e.g., hydraulic or pneumatic) in a known manner. Piston 76 may be disposed within axle housing 22 and may be configured to receive a dowel pin 114 extending from housing 22 by which piston 76 may be fixed against rotation. The size and shape of piston 76 may be varied relative to design considerations associated with axle housing 22.

Adapter hub 78 is provided to support friction plate members 110 of friction plate assembly 74. Hub 78 may be made from conventional metals and metal alloys. Hub 78 may be annular in construction and may be disposed about axis 12 and coupled to axle half shaft 14 through one or more splines (not shown). Hub 78 may itself include one or more splines 116 on which friction plate members 110 of assembly 74 may be supported for axial movement. Hub 78 may be adjacent to portion of 54 carrier 24.

Thrust bearing 80 is provided to absorb axial thrust from piston 76 and is conventional in the art. Bearing 80 is disposed between piston 76 and assembly 74.

Brake assembly 20 operates as follows. When piston 76 is actuated, piston 76 moves in a first axial direction (to the right in FIG. 1). Piston 76 (which may act through thrust bearing 80) compresses friction plate assembly 74 causing friction plate members 110 and reaction plate members 112 to move axially along splines 100, 116, respectively, and against the friction surface provided by differential hub 70. Hub 70 also moves axially along spline(s) 56 and compresses friction plate assembly 72 causing friction plate members 104 and reaction plate members 106 to move axially along spline(s) 56 and against the friction surface provided by portion 82 of brake housing 68. Braking torque is transferred to carrier 24 through portion 54 of carrier 24 thereby preventing rotation of carrier 24 which in turn prevents rotation of both axle half shafts 14, 16.

When a vehicle incorporating axle assembly 10 is on dry ground and stopping in a straight line, there is no relative rotation between carrier 24 and axle half shaft 14, 16. As a result, assemblies 72, 74 are rotating in unison and the braking torque is generated by assembly 72.

When a vehicle incorporating axle assembly 10 is on dry ground and stopping in a curved path, relative rotation occurs between friction plate members 110 and reaction plate members 112 of assembly 74. This relative rotation generates a torque biasing action that provides a greater amount of braking torque to the inside wheel (relative to the turn).

When a vehicle incorporating axle assembly 10 stops in a straight line and there is very poor traction between the vehicle and ground (such as when one wheel is on concrete and the other wheel is on ice) and a maximum brake pressure is applied through piston 76, friction plate assembly 72 immediately stops differential carrier 24 from rotating. Because the bias ratio of friction plate assembly 74 may be exceeded, the differential 18 and assembly 74 may begin to spin. In this event, assembly 74 will provide the braking torque with a majority of the torque provided to the wheel having superior traction (e.g., the wheel on concrete).

A brake assembly 20 in accordance with the present invention represents a significant improvement as compared to traditional brake assemblies for drive axles. Traditional brake assemblies have two brakes in the axle, one for each wheel. The use of multiple braking devices requires additional parts and materials and increases assembly time-all of which increase the cost of the drive axle assembly. The use of multiple braking devices also increases the size and weight of the drive axle assembly. The inventive brake assembly 20 is less expensive to manufacture because fewer materials are needed, yet maintains effective brake capacity and vehicle handling characteristics.

While the invention has been particularly shown and described with reference to the preferred embodiments thereof, it is well understood by those skilled in the art that various changes and modification can be made in the invention without departing from the spirit and scope of the invention.

I claim:

1. A brake assembly for a drive axle, comprising:
   a brake housing;
   a differential hub coupled to a differential carrier disposed about a first axis and axially movable relative to said differential carrier and said brake housing;
   a first friction plate assembly disposed on a first side of said differential hub between the differential hub and the brake housing, the first friction plate assembly axially movable relative to the differential carrier and brake housing;
   a second friction plate assembly disposed on a second side of said differential hub, the second friction plate assembly axially movable relative to said differential carrier; and,
   a piston configured to selectively urge said second friction plate assembly, said differential hub, and said first friction plate assembly in a first axial direction against said brake housing.

2. The brake assembly of claim 1, further comprising a thrust bearing disposed between said piston and said second friction plate assembly.

3. The brake assembly of claim 1 wherein said brake housing includes a portion extending radially outwardly from said differential carrier and against which said piston urges said second friction plate assembly, said differential hub, and said first friction plate assembly.

4. The brake assembly of claim 1 wherein said brake housing includes an axially extending portion to which at least one member (106) of said first friction plate assembly is coupled.

5. The brake assembly of claim 4 wherein said member of said first friction plate assembly is coupled to said portion of said brake housing through a spline connection.

6. The brake assembly of claim 1 wherein said differential hub is coupled to said differential carrier through a spline connection.

7. The brake assembly of claim 1 wherein said differential hub includes an axially extending portion to which at least one member of said second friction plate assembly is coupled.

8. The brake assembly of claim 7 wherein said member of said second friction plate assembly is coupled to said portion of said differential hub through a spline connection.

9. The brake assembly of claim 1 wherein said first friction plate assembly includes a first member coupled to said brake housing and a second member coupled to said differential carrier.

10. The brake assembly of claim 1 wherein said second friction plate assembly includes a first member coupled to said differential hub and a second member coupled to an adapter hub disposed axially adjacent to said differential carrier.

11. The brake assembly of claim 1 wherein said piston is fixed against rotation.

12. A brake assembly for a drive axle, comprising:
    a brake housing coupled to a differential carrier disposed about a first axis, said brake housing having a first portion extending radially outwardly from said differential carrier and a second axially extending portion, said second portion having a first spline;
    a differential hub coupled to a second spline on said differential carrier and axially movable relative to said differential carrier and said brake housing, said differential hub having an axially extending portion having a third spline;
    a first friction plate assembly disposed on a first side of said differential hub between the differential hub and the brake housing, the first friction plate assembly axially movable relative to the differential carrier and brake housing and having a first member coupled to said first spline and a second member coupled to said second spline;
    a second friction plate assembly disposed on a second side of said differential hub, the second friction plate assembly axially movable relative to said differential carrier and having a first member coupled to said third spline and a second member coupled to a fourth spline of an adapter hub axially adjacent said differential carrier; and,
    a piston configured to selectively urge said second friction plate assembly, said differential hub, and said first friction plate assembly in a first axial direction against said first portion of said brake housing.

13. The brake assembly of claim 12, further comprising a thrust bearing disposed between said piston and said second friction plate assembly.

14. The brake assembly of claim 12 wherein said brake housing is coupled to said differential carrier through bearings.

15. The brake assembly of claim 12 wherein said piston is fixed against rotation.

16. A drive axle assembly, comprising:
    a differential carrier having first and second axle half shafts extending therefrom, said carrier and first and second axle half shafts disposed about a first axis;
    a brake housing;
    a differential hub coupled to said differential carrier and axially movable relative to said differential carrier and said brake housing;
    a first friction plate assembly disposed on a first side of said differential hub between the differential hub and the brake housing, the first friction plate assembly axially movable relative to the differential carrier and brake housing;
    a second friction plate assembly disposed on a second side of said differential hub, the second friction plate assembly axially movable relative to said differential carrier; and,
    a piston configured to selectively urge said second friction plate assembly, said differential hub, and said first friction plate assembly in a first axial direction against said brake housing.

17. The brake assembly of claim 16, further comprising a thrust bearing disposed between said piston and said second friction plate assembly.

18. The brake assembly of claim 16 wherein said first friction plate assembly includes a first member coupled to said brake housing and a second member coupled to said differential carrier.

19. The brake assembly of claim 16 wherein said second friction plate assembly includes a first member coupled to said differential hub and a second member coupled to a an adapter hub disposed axially adjacent to said differential carrier.

20. The brake assembly (20) of claim 16 wherein said piston (76) is fixed against rotation.

* * * * *